Jan. 24, 1939. M. F. BATES Re. 20,983

GYRO-MAGNETIC COMPASS

Original Filed Nov. 16, 1933 2 Sheets-Sheet 1

INVENTOR
MORTIMER F. BATES
BY
Herbert H. Thompson
HIS ATTORNEY.

Jan. 24, 1939. M. F. BATES Re. 20,983

GYRO-MAGNETIC COMPASS

Original Filed Nov. 16, 1933 2 Sheets-Sheet 2

INVENTOR
MORTIMER F. BATES
BY
Herbert H. Thompson
HIS ATTORNEY.

Reissued Jan. 24, 1939

Re. 20,983

UNITED STATES PATENT OFFICE 20,983

GYRO-MAGNETIC COMPASS

Mortimer F. Bates, Brooklyn, N. Y., assignor to Sperry Gyroscope Company, Inc., Brooklyn, N. Y., a corporation of New York Original No. 2,135,229, dated November 1, 1938, Serial No. 698,263, November 16, 1933. Application for reissue November 26, 1938, Serial No. 242,507

14 Claims. (Cl. 33—222)

This invention relates to a gyro-magnetic compass or directional device of the types disclosed in prior patents to Elmer A. Sperry, Jr., and Herbert H. Thompson, No. 2,092,032, dated September 7, 1937, and Elmer A. Sperry, Jr., and Bruno A. Wittkuhns, No. 1,988,521, dated January 22, 1935. According to the present invention the prior constructions are greatly simplified in that the magnetic needle according to my present invention is placed directly on the gyro casing so as to avoid the necessity for remote control devices between the magnetic compass and the directional gyroscope and also securing the advantage of stabilizing the magnetic needle in at least one plane. In carrying out my invention I have also devised an improved method of applying torques on the gyroscope upon relative displacement of the magnetic needle and gyroscope without disturbing the needle itself. Also in carrying out my invention I have devised novel forms of non-magnetic bearings for the gyro rotor and gimbal supports to avoid distorting the earth's field adjacent the magnetic needle.

Referring to the drawings showing preferred form of the invention,

Figure 1:
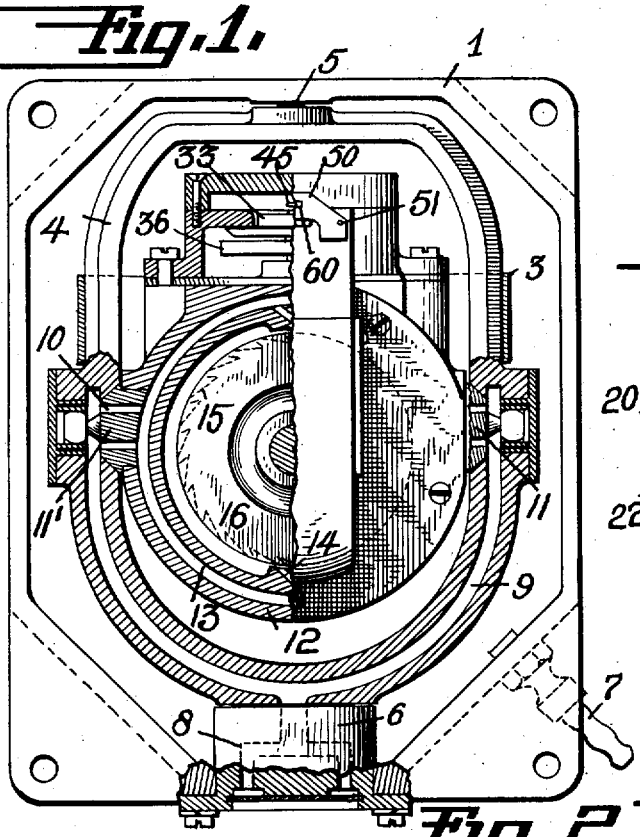
Fig. 1 is a side elevation, partly in section, of my improved gyro-magnetic compass.
Figure 3:
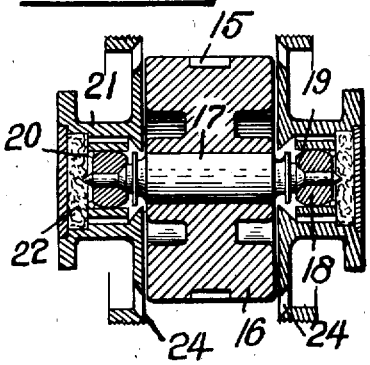
Fig. 3 is a detailed sectional view of the gyro rotor and rotor bearings.
Figure 4:
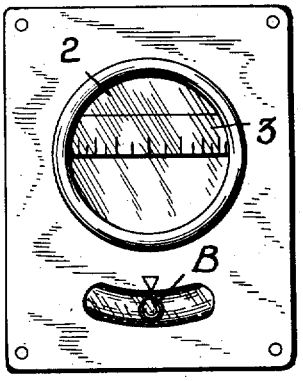
Fig. 4 is a face view of the instrument on a reduced scale.

The instrument is shown as enclosed within an outer casing 1 adapted to be attached to the instrument board of an aircraft, the casing having a window 2 therein through which is visible the compass card 3 which may be mounted on the vertical ring 4 of the instrument. A ball bank indicator B may also be incorporated therein, if desired. Said vertical ring is shown as pivoted about a vertical axis in upper and lower bearings 5 and 6 within the casing 1. If air pressure is employed for spinning the rotor and exerting the required torques, casing 1 may be made air-tight and air continuously withdrawn therefrom through connection 7 so that the air pressure within the casing is below that of the atmosphere. Air for spinning the rotor enters the case through channels 8 in the lower vertical bearing, from whence it passes through channels 9 in the vertical ring to passages 10 through the horizontal trunnions 11, 11' of the rotor bearing ring or casing 12. From thence the air passes through channel 13 in said casing to the jet or jets 14 which direct blasts of air against the blades or buckets 15 cut in the periphery of the gyro rotor 16.

The rotor is shown as journaled on a normally horizontal spinning axis within the casing. In order to avoid the use of magnetic materials, the rotor is preferably made of brass or other heavy non-magnetic material and the shaft 17 thereof may be made of non-magnetic stainless steel. Ball bearings are preferably avoided to eliminate possible magnetism of the same and in their stead the rotor shaft 17 is journaled at its reduced ends in plain bearing blocks 18 of non-magnetic material. End play is taken up by yieldingly holding said bearing blocks inwardly against the inclined shoulders 19 on the shaft by means of a small spring clip 20 within the outer housing 21. Preferably an oil saturated disc or discs 22 is placed beyond said clip to maintain a snug fit of the bearings and adequate oiling under all conditions.

Preferably air is also made use of to apply controlling torques on the gyroscope both for maintaining the axis of spin horizontal and for coercing the spin axis of the gyroscope in azimuth to maintain the magnetic needle and rotation of the gyroscope in the same plane. For the former purpose, the used air, after impinging the buckets on the gyroscope, escapes through apertures 24 in the casing immediately surrounding the gyroscope into a space or spaces 25, 25' between the rotor housing 21 and the outer walls 26, 26' of the gyro casing which are expanded to form said spaces 25, 25' beyond the rotor bearings. One or both of said extensions is provided with apertures 27 and 28 through which at least a portion of the used air escapes to the atmosphere. Said apertures are preferably in the form of vertical slots which may be normally open or partially closed by small pendulous shutters 29 and 29′ pivoted above the same at 30 and 30′ respectively. The centers of said slots 27 and 28 preferably lie in the same horizontal plane as the trunnions 11 and 11′ of the gyroscope. On tilting of the gyro axis about the trunnions 11, 11′, the rate of flow is decreased through one aperture and may also be increased through the other, thus resulting in an unequal reaction torque about the vertical axis of the gyroscope to bring the spin axis of the same back to horizontal. This feature per se is covered in my prior Patent No. 2,015,650, dated October 1, 1935, for Directional gyroscopes.

Another portion of said air passes up through passages 31 and 31′ and out through one (or both) of laterally or tangentially directed ports 32 and 32′ (if and when opened) so as to exert an unbalanced or opposite torque about the horizontal axis 11, 11′ of the gyroscope in one or the other direction. Accordingly I differentially control the air flow through said ports by the relative position of the gyroscope and magnetic needle in azimuth. I believe it impractical to attempt to move the shutters for said ports directly from the magnetic needle on account of the reactive effect of the relatively strong air flow necessary to obtain the proper torque. I therefore provide an improved relay system whereby all torque is avoided on the magnetic needle.

Figure 2:
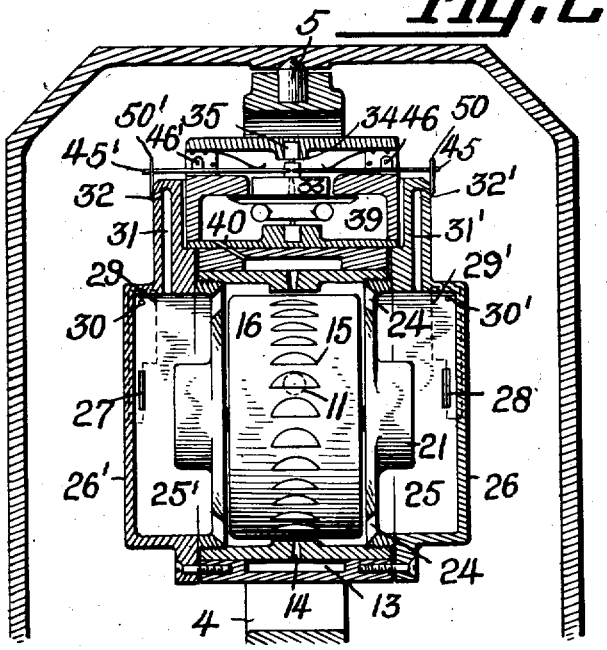
Fig. 2 is a vertical section taken at right angles to Fig. 1.
Figure 5:
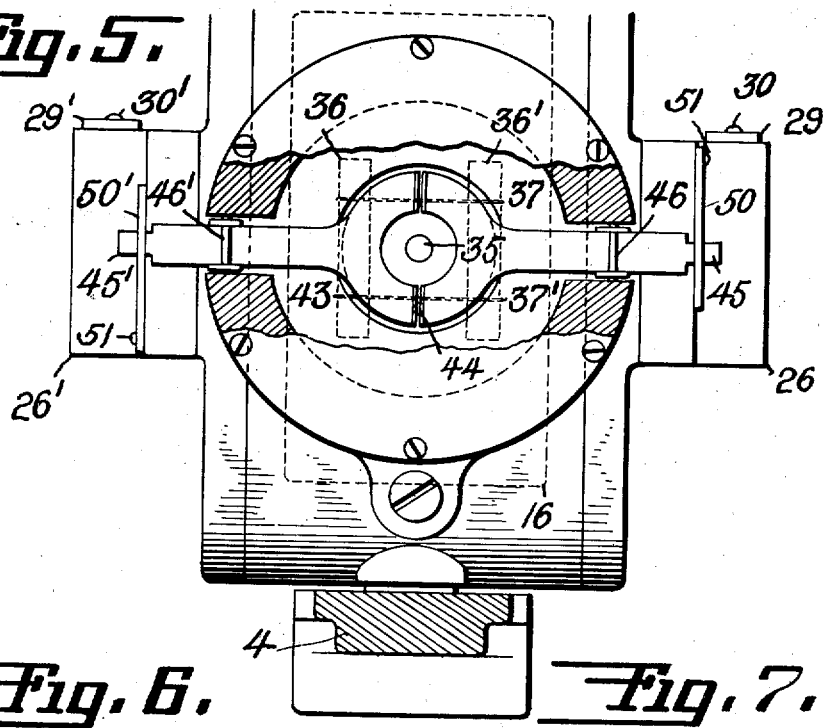
Fig. 5 is a plan view on a larger scale of the top of the rotor casing showing the pivoted controlling or relay shutters or levers.
Figure 6:
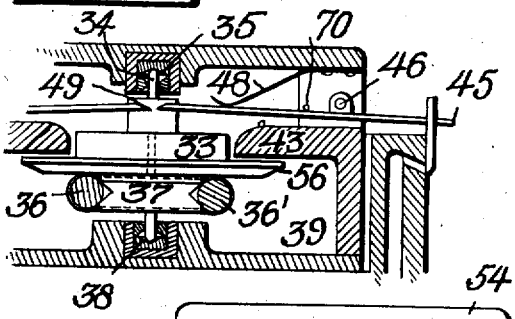
Fig. 6 is a side elevation of the same, partly in section.
Figure 7:
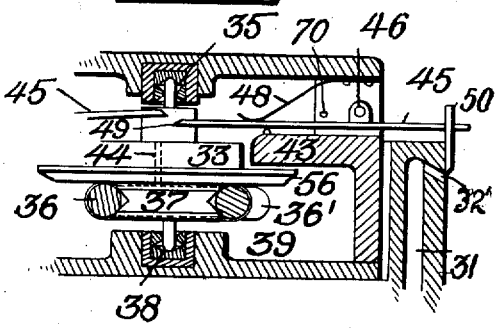
Fig. 7 is a similar view showing the action that takes place upon relative turning of the needle and gyroscope.

It will be understood that I use the term "magnetic needle" in this specification to designate any suitable form of magnetic compass element which, in this case, is shown as comprising a central boss 33, to the top of which is secured a guide pin 34 journaled in upper jeweled bearing 35. Said boss is shown as having on the under surface thereof a flange 56 underneath which is a square block 37 having a V-shaped notch in opposite sides thereof to receive a pair of permanent magnets 36 and 36′. Said magnets may be firmly held in place by cross straps 37′. A lower jeweled bearing 38 is also provided so that the compass card is stabilized by the gyroscope on which it is mounted. Air is admitted to the chamber 39 beneath the magnetic element as by means of a restricted bore 40 which enters the channel 13 supplying the spinning air to the gyroscope. The pressure, however, in compartment 39 is greatly reduced, being no greater than or less than the pressures in chambers 25, 25′. A gentle escape of air from said chamber occurs through an aperture 44 extending through the boss 33. The air from said opening discharges upwardly and normally midway between and equally against the adjacent inner ends of a pair of pivoted arms 45 and 45′ pivoted at 46 and 46′ on the casing. Said arms are shown as having substantially semicircular annular inner ends so as to lie above the jet 44, which is positioned to one side of the pivot pins 35 and 38 of the needle, so that when relative turning occurs between the needle and gyroscope the jet will be displaced with respect to the ends of the levers 45, 45′ so as to reduce the lifting effect of the jet on one lever and increase it on the other. Preferably the levers are gravitationally balanced around pivots 46, 46′ and weak springs 48 may be employed to hold the levers approximately balanced against the gentle up-lift of the air flow when the jets are central as shown in Figs. 2 and 6, further movement being prevented by stops 70. As soon, however, as relative turning takes place the air flow against one lever is reduced and against the other increased so that the end of the former lever is lowered as shown in Fig. 7. This effect may be increased by beveling the upper edge of each lever as shown at 49, so that the escaping air will then assist in forcing the lower lever downwardly.

Figure 8:
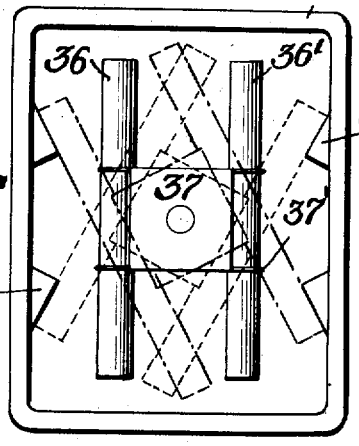
Fig. 8 is a horizontal section through the top of a modified form of compass housing showing also the construction of the magnetic needle element.
Figure 9:
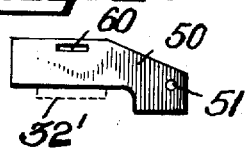
Fig. 9 is a side view of the shutters or vanes employed in governing the torque about the horizontal axis.

To the outer end of each of said levers is connected, as by means of a slot 60 in each shutter through which loosely extends the reduced end of the adjacent lever, a shutter 50, 50′. Said shutters are pivoted at 51, 51′ respectively at right angles to the pivots 46, 46′, so that the air reaction thereon does not affect the lever 45, 45′. The free ends of said shutters may normally be positioned similarly with respect to the above described apertures 32, 32′ as are vanes 29 with respect to slots 27, but I prefer to design the shutters 50, 50′ so as to normally close both apertures. Any lowering of the inner end of either lever 45 or 45′ will raise the connected shutter 50 or 50′ to open the adjacent port. Thereby a reactive torque will be exerted about the horizontal axis of the gyroscope to cause it to precess in azimuth until its position coincides with that of the magnetic needle. The magnets 36, 36′ are preferably of substantial length to obtain the maximum meridian seeking properties and stops 53 may be provided to limit their movement within the housing, if the housing 54 be made rectangular as shown in Fig. 8.

I also prefer to employ differential air pressure for increasing the sensitivity of the magnetic compass. Since the pressure within the space 39 is above that in the surrounding casing 1, the air pressure exerted against the bottom of the disc 56 will be greater than that on the top thereof, thereby tending to support the weight of the magnetic element. Preferably a slight clearance is maintained between the upper portion of the disc 56 and the inwardly extending annular flange 43 on the casing so as to avoid any frictional contact and permit a gentle escape of air which prevents metallic contact. By properly designing the area of the disc 56 with fererence to the differential air pressure within and without the chamber 39, I may support the entire weight of the magnetic element by air pressure, thus relieving the pivots 35 and 38 of any gravitational load.

My construction possesses many advantages over both the magnetic compass and the directional gyroscope. It overcomes the tendency of the directional gyroscope to wander and, therefore, with my improved device no resetting of the gyroscope is required. Since the compass card 3 is mounted on the gyroscope it will not be subject to temporary violent disturbance due to turning of the aircraft as is the magnetic compass, because although the magnetic compass may be disturbed at times, the torques on the gyroscope resulting therefrom are comparatively weak so that the gyroscope will be little disturbed by temporary deviations of the magnetic compass. Also, the stops 53 will prevent the magnetic compass from being turned very far from the meridian so that it will settle much quicker than an ordinary magnetic compass. In addition, by mounting the magnetic compass on the gyroscope, the disturbing effect of intercardinal rolling and pitching of the craft is avoided. Preferably the magnetic needle is mounted on the craft so as to extend substantially normally at right angles to the spin axis of the gyroscope. In other words, the spin axis of the gyroscope normally lies east and west. In this position the magnetic needle lies parallel to the trunnion axis 11, 11' and is, therefore, stabilized against rolling in the vertical N.—S. plane, which is the most serious cause of compass disturbance.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A gyro-magnetic compass comprising a gyro rotor, a rotor bearing casing in which said rotor is journaled on a horizontal spin axis, an outer ring in which said casing is journaled about a second horizontal axis at right angles to said other axis, an outer frame in which said ring is journaled about a third perpendicular axis, a magnetic needle pivoted on said casing about a normally vertical axis, there being an air port in said needle to one side of its pivot, means for causing air flow therethrough, and a pair of oppositely extending biased shutters, the adjacent ends of which are normally equally impinged by the air flow from said port and acting as cut-off shutters for a pair of oppositely acting reaction ports in said casing positioned to exert a torque about the horizontal axis of the casing in a direction to align the gyroscope and needle.

2. A gyro-magnetic compass comprising an air spun gyro rotor, a rotor bearing casing in which said rotor is journaled, means for leading in air for spinning the rotor, a magnetic needle member pivoted on said casing and having a small port through which a small portion of said air escapes, a larger laterally directed port in said casing through which a larger portion of said air escapes, and a pivoted shutter having one part lying adjacent said larger port to vary the air flow when moved and another part adjacent said small port to be impinged by the air stream therefrom and moved thereby upon relative turning of the needle and casing.

3. A gyro-magnetic compass comprising a gyro rotor, a rotor bearing casing in whch said rotor is journaled, means for supporting said casing for freedom about horizontal and vertical axes, means for creating a superior air pressure within said casing, a pair of laterally spaced exhaust ports permitting a portion of said air to escape and exert when so doing opposite reaction about the vertical axis thereof, pendulous means pivoted adjacent thereto for reversely governing said ports upon relative tilt of said casing and pendulous means, a second pair of exhaust ports to one side of the horizontal axis of said casing and permitting another portion of said air to escape and exert when so doing opposite reactions about said horizontal axis, controlling shutters pivoted one adjacent each of said second pair of ports, a magnetic needle member pivoted in said casing, and air jet means controlled by the relative turning of said needle and casing for oppositely rotating said shutters on their pivots to differentially close said ports.

4. A gyro-magnetic compass comprising a gyro rotor, a rotor bearing casing in which said rotor is journaled, means for supporting said casing for freedom about horizontal and vertical axes, means for creating a superior air pressure within said casing, a pair of laterally spaced exhaust ports permitting a portion of said air to escape and exert when so doing opposite reactions about the vertical axis thereof, pendulous means pivoted adjacent thereto for reversely governing said ports upon relative tilt of said casing and pendulous means, a second pair of exhaust ports to one side of the horizontal axis of said casing and permitting another portion of said air to escape and exert when so doing opposite reactions about said horizontal axis, controlling shutters adjacent thereto, a magnetic needle member pivoted in said casing and having a small eccentric port through which another portion of said air escapes, and a pair of shutters differentially controlled by the air from said port, said shutters controlling the amount of air escaping through said second pair of exhaust ports.

5. A remote or power control for magnetic compasses and the like comprising the combination with the magnetic needle element, a disc thereon, means for maintaining a superior air pressure thereunder than above the same to support the weight of said element, said element also having an eccentric aperture through which some of said air pressure escapes, a pair of opposed biased pivoted vanes, the free ends of which lie adjacent said aperture, and a shutter connected one to each vane and adapted to open and close a pair of oppositely acting air ports upon respective opposite rotations between said needle element and vanes.

6. A remote or power control for magnetic compasses and the like comprising the combination with the magnetic needle element, means for maintaining a superior air pressure thereunder than above the same, said element also having an eccentric aperture through which some of said air pressure escapes, a pair of pivoted levers, the ends of which lie above said aperture and are beveled on the upper adjacent edges thereof, whereby the sensitivity of the vanes is increased, and shutters pivoted on axes at right angles to the pivots of said vanes and connected one to each vane and adapted to open and close a pair of oppositely acting air jets.

7. In a gyro-magnetic compass, the combination with a directional gyroscope and a magnetic element pivotally mounted thereon, of a first air jet means turned by said element and a second air jet means on said gyroscope, shutters on said gyroscope differentially operated by the first jet means and acting as differential valves for said jet means to cause an unbalanced torque on the gyroscope about its horizontal axis upon departure of said element and gyroscope from a predetermined azimuthal relation, whereby the gyroscope precesses to follow the average position of said magnetic element.

8. In a gyro-magnetic compass, the combination with a directional gyroscope and a magnetic element pivotally mounted thereon, of an air jet on said element and rotatable therewith, shutter means on said gyroscope, a source of power differentially controlled by said shutter means, said jet impinging said shutter means to control the source of power to exert precessing torques on the gyroscope without reacting on said magnetic element.

9. A gyro-magnetic compass comprising a directional gyroscope having a rotor bearing casing mounted for freedom about a vertical and a horizontal axis, means for creating a superior air pressure in said casing, a magnetic element pivotally mounted top and bottom on said casing, a disc on said element subject to the superior air pressure thereunder to carry the weight of said element, said element also having an eccentric port through which some of said air escapes, and shutter means on said casing intercepted by the jet from said port, so constructed and arranged as to cause a torque to be exerted about the horizontal axis of the gyroscope upon relative turning of said port and shutter means to cause the gyroscope to slowly follow the element in azimuth.

10. A gyro-magnetic compass comprising a gyro rotor, a rotor bearing casing in which said rotor is journaled, means creating a superior air pressure in said casing, a magnetic needle member pivoted on said casing and having a small port through which a small portion of said air escapes, a larger laterally directed port in said casing through which a larger portion of said air escapes, and a pivoted shutter having one part lying adjacent said larger port to vary the air flow from said port when said shutter is moved and another part adjacent said small port to be impinged by the air stream therefrom and so moved thereby upon relative turning of the needle and casing.

11. A gyro-magnetic compass comprising a gyro rotor, a rotor bearing casing in which said rotor is journaled, means mounting said rotor casing for universal pivotal movement, means for creating a superior air pressure in said casing, a magnetic needle member pivoted on said casing, a disc on said member subject to superior air pressure thereunder to urge the same upwardly, said member also having an eccentric port through which some of said air pressure escapes, a larger horizontally directed port in said casing through which a portion of said air escapes, and a pivoted shutter having one part lying adjacent said latter port to vary the air flow when moved and another port adjacent said first named port to be impinged by the air stream therefrom and moved thereby upon turning of the casing relative to the needle.

12. A gyro-magnetic compass comprising a directional gyroscope having a rotor bearing casing mounted for freedom about a vertical and a horizontal axis, a magnetic element pivotally mounted on said casing, air discharge channel means passing through said element and turnable therewith, means for maintaining a superior air pressure below said element to cause a jet discharge from said channel means which is displaceable as the element turns, and shutter means on said casing intercepted by said jet, so constructed and arranged as to cause a torque to be exerted upon the horizontal axis of the gyroscope upon relative turning of said jet and shutter means to cause the gyroscope to slowly follow the element in azimuth.

13. In a gyro-magnetic compass, the combination with a directional gyroscope and a magnetic element pivotally mounted thereon, of a primary air flow pick-off means operated upon relative turning of said element and gyroscope, secondary oppositely acting air jets on said gyroscope for exerting torques in opposite directions about the horizontal axis thereof, and a relay device actuated from said primary means for differentially varying the flow from said secondary jets to cause said gyroscope to follow the magnetic element in azimuth.

14. In a gyro-magnetic compass, the combination with a directional gyroscope and a magnetic element pivotally mounted thereon, of a primary air flow pick-off means of small power operated upon relative turning of said element and gyroscope, means for exerting torques of a greater order of magnitude in opposite directions about the horizontal axis of said gyroscope, and a relay actuated means controlled by the flow from said primary pick-off means for differentially controlling said torque exerting means.

MORTIMER F. BATES.